United States Patent Office 2,789,650
Patented Apr. 23, 1957

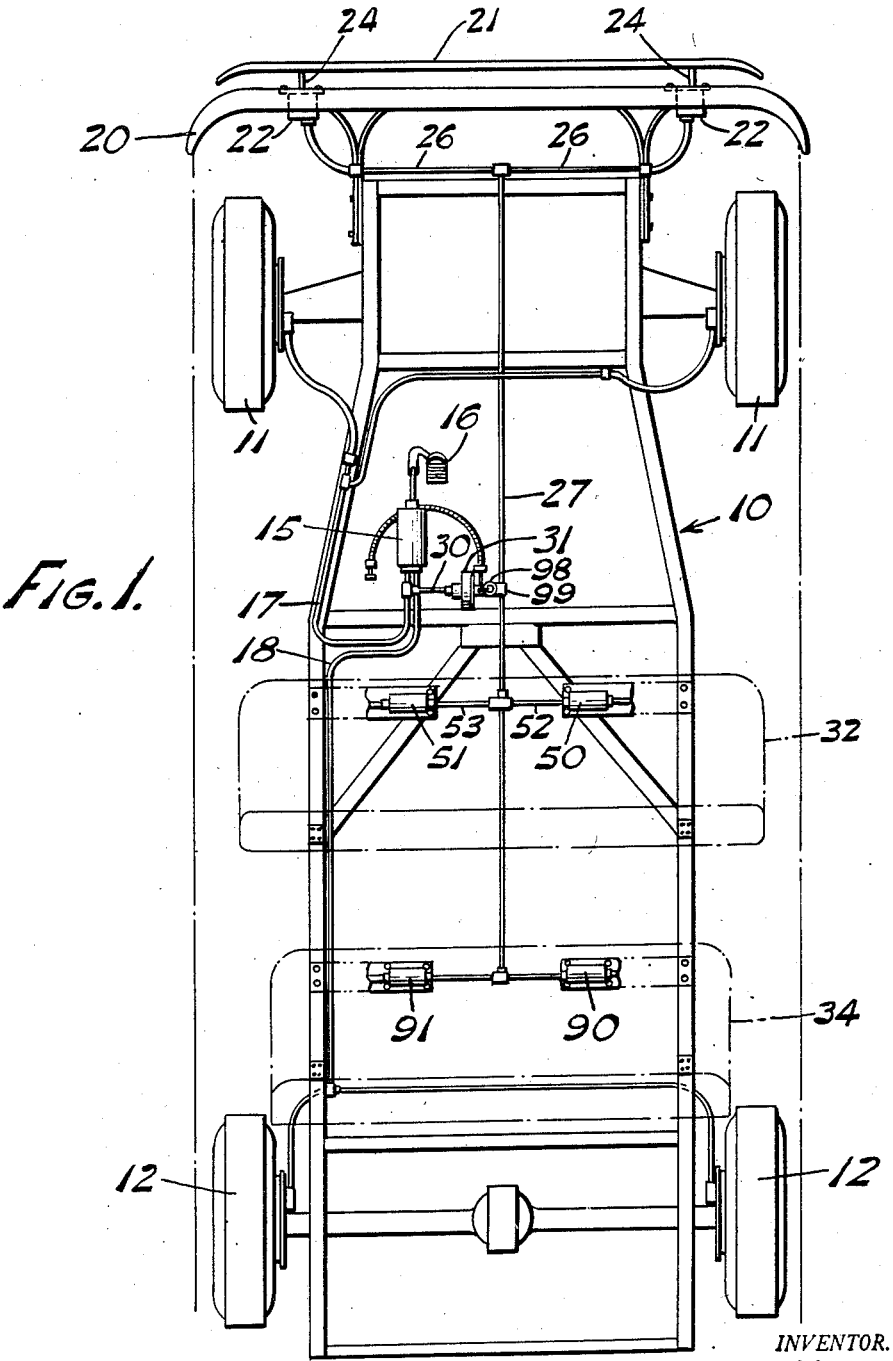

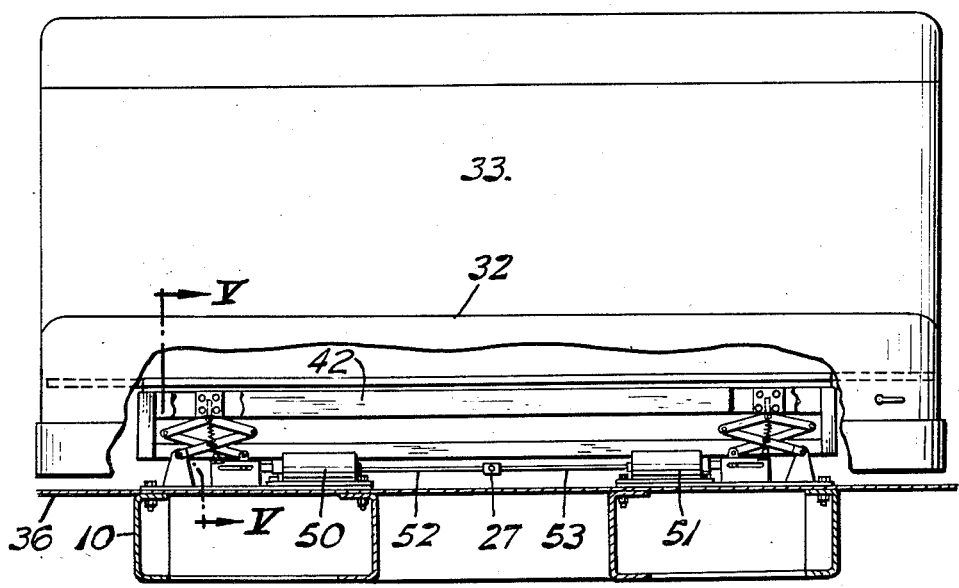
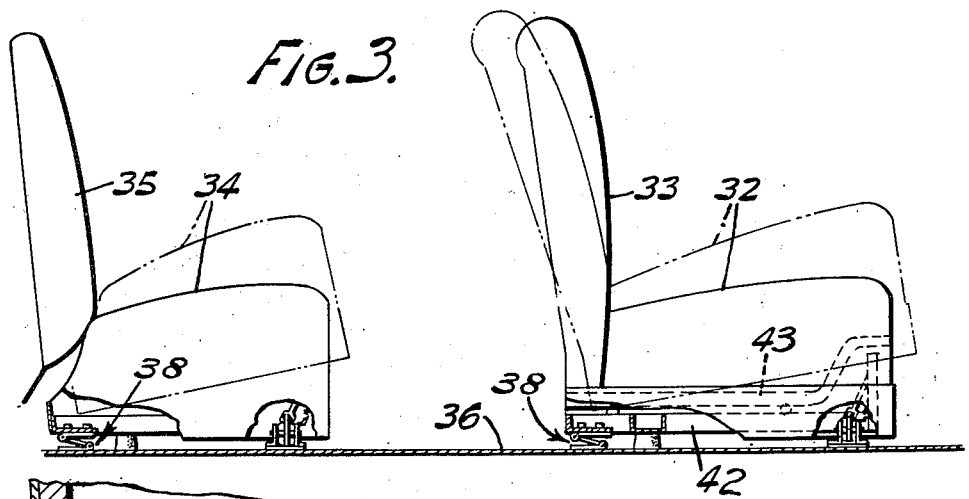
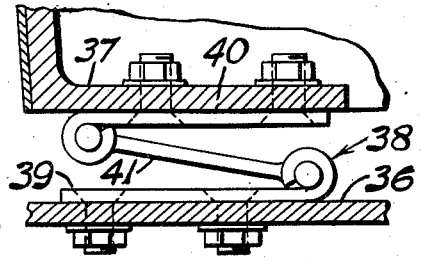

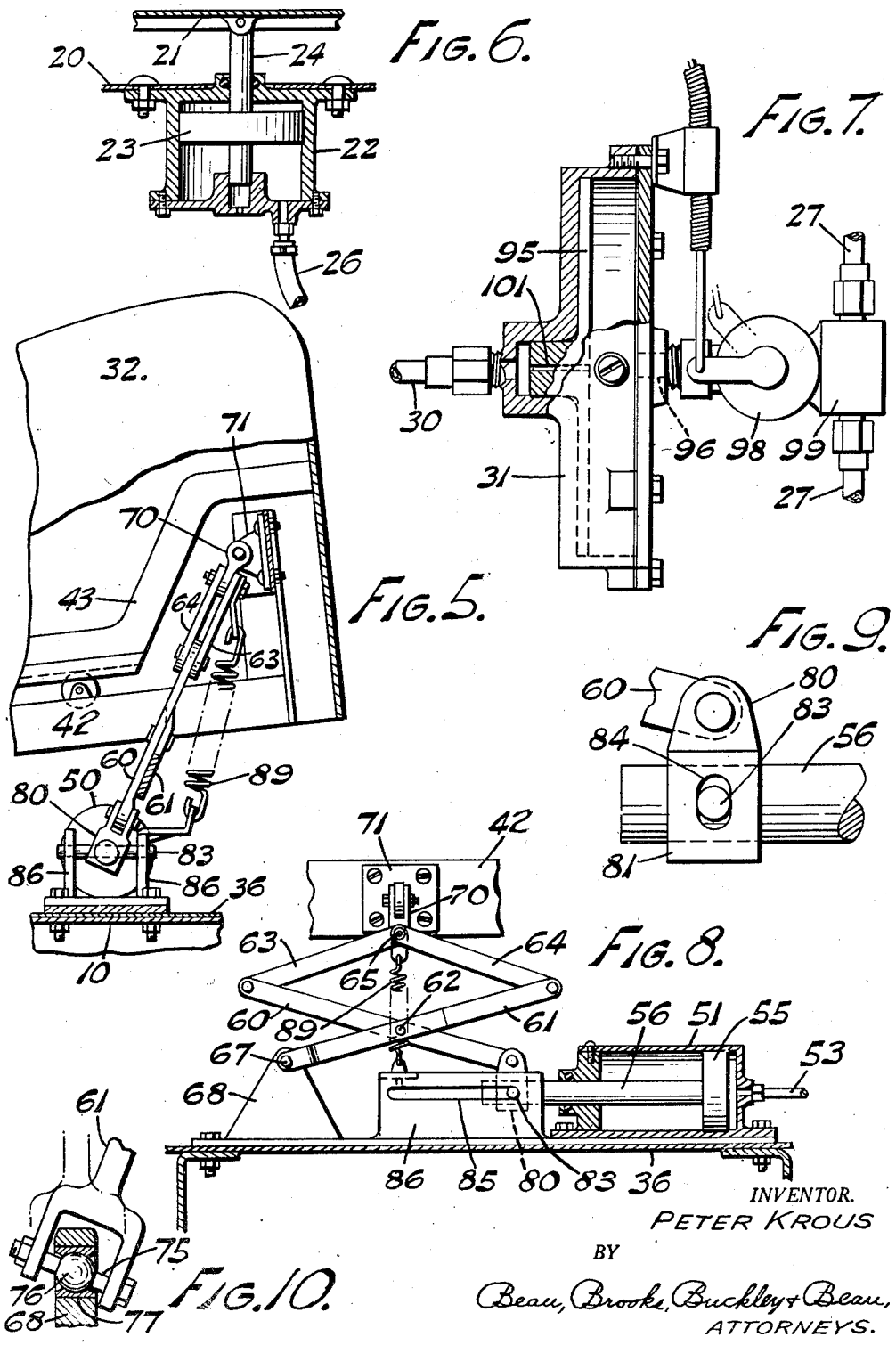

2,789,650

SAFETY VEHICLE SEAT

Peter Krous, Cheektowaga, N. Y., assignor to Roger Racine

Application July 3, 1953, Serial No. 365,827

4 Claims. (Cl. 180—82)

This invention relates to automotive vehicles and particularly to an automotive seating arrangement which protects the operator and passengers against injury due to sudden stopping of the vehicle, either through collision or impact or due to sudden application of the brakes of the vehicle.

Whenever an automotive vehicle is involved in a front end collision or a similar impact, injuries to the operator or passengers therein are in nearly every case caused by the passengers being thrown against forwardly disposed portions of the vehicle. In the case of the operator or front seat passengers this impact of the passengers is generally against the windshield or the portions of the vehicle body lying beneath the windshield while in the case of rear seat passengers this impact may be against the rear of the front seat or, in some cases, the passengers may be thrown over the front seat, again against the windshield or other forward portions of the vehicle body.

In the case of sudden brake applications, particularly those due to emergency conditions or attempts to avoid collision, a similar but less violent tendency is present for the operator or passengers to be thrown forwardly against the windshield or other portions of the vehicle body, as a result of which personal injuries are frequently suffered.

In its broadest aspect the present invention provides a system whereby the passenger seat or seats operate automatically to cradle the occupants thereof and thus overcome or nullify the normal tendency of the passenger to be thrown forwardly off the seat and against injury-inflicting obstructions. More particularly, the present invention provides hydraulic means operable automatically upon impact or collision of the front of the vehicle or upon violent or substantial brake application for rocking the vehicle seat rearwardly about a lower transverse pivotal connection or the like to thus automatically cradle the passenger in the seat to thus nullify the inertia forces tending to throw the passenger forwardly in the vehicle.

A further object of the present invention is to move the vehicle seat bodily forwardly in combination with the aforesaid rotating or rocking movement to more certainly and efficiently retain the passenger in the seat in conjunction with the cradling movement of the seat about its pivotal connection. Further, the system of the present invention is so arranged that the seat movement is automatically variable in response to collision impacts or brake applications of varying degrees so that the compensating cradling action and forward movement of the seat is proportioned to the violence of the impact or the degree of deceleration resulting from a particular brake application.

The following specification and the accompanying drawings set forth a representative practical embodiment of the principles of the present invention by way of example but it is to be understood that the scope of the present invention is not limited thereto or otherwise than as defined in the appended claims.

In the drawings:

Fig. 1 is a general top plan view of an automotive vehicle chassis with portions thereof broken away, showing schematically the hydraulic system of one form of the present invention;

Fig. 2 is a front elevational view of a passenger seat with portions thereof broken away for added clearness and showing one form of hydraulic lifting device constructed according to the present invention;

Fig. 3 is a fragmentary somewhat schematic side elevational view showing front and rear seat portions of a vehicle body, likewise with portions thereof broken away for added illustration;

Fig. 4 is a detailed fragmentary cross sectional view of one of the lower rear seat connection devices;

Fig. 5 is a detailed fragmentary cross sectional view of the front portion of the vehicle seat of Fig. 2 taken approximately on the line V—V of Fig. 2;

Fig. 6 is a horizontal cross sectional view through one of the bumper-actuated hydraulic cylinders of the control system;

Fig. 7 is a horizontal cross sectional view, appearing partly in top plan, of a control piston and cylinder portion of the hydraulic system of Fig. 1;

Fig. 8 is a fragmentary rear elevational view of a portion of the seat lifting mechanism of Fig. 2 on an enlarged scale and with portions thereof shown in cross section for added clearness;

Fig. 9 is a detailed fragmentary view of a portion of the mechanism of Fig. 8; and Fig. 10 is a cross sectional view through one of the linkage connections of the mechanism of Fig. 8.

Speaking generally, the system of the present invention, in the form set forth herein by way of example, comprises fluid motor means for tilting the passenger seat or seats rearwardly upon impact or sudden stopping, such fluid motor means being activated either by impingement of the front of the vehicle against an object, an obstruction, another vehicle, or the like, or by excessive fluid pressure developed in the vehicle braking system by reason of relatively sudden or severe application of the brakes.

Referring first to Fig. 1, the numeral 10 designates generaly a conventional vehicle chassis frame including front wheels 11 and rear wheels 12. A conventional hydraulic brake system master cylinder is designated 15 and the brake actuating pedal therefor is designated 16. In the present instance master cylinder 15 is of the type which includes a pair of pressure output conduits 17 and 18 which extend to the usual front and rear wheel brake cylinders, respectively.

In Fig. 1 the numeral 20 designates a more or less conventional front bumper and the numeral 21 designates an auxiliary front bumper element which may be more properly referred to as an actuating means and which extends transversely of the vehicle and is mounted to project forwardly of conventional bumper 20. A pair of front bumper hydraulic cylinders are designated 22 and in the present instance are mounted rigidly against front bumper 20. The front bumper hydraulic cylinders 22 are shown in detail in Fig. 6 and contain piston members 23 and piston rods 24 which extend forwardly into connection with auxiliary bumper 21. Each front bumper hydraulic cylinder 22 has an output fluid conduit 26 and, referring again to Fig. 1, the conduits 26 merge with a main seat-operating fluid conduit 27.

The hydraulic braking system also has connection with the main fluid conduit 27 which supplies pressure for operating the vehicle seat devices of the present invention. In the present instance the front wheel hydraulic brake conduit 17 has a branch conduit 30 which leads to a valving device 31 which will be more completely described hereinafter, the output from valving device 31 leading in turn to operating fluid conduit 27.

Referring now to Fig. 3, the numeral 32 designates a front vehicle seat having a back member 33 rigidly associated therewith. A rear seat member is designated 34 and in this instance the seat back, designated 35, is mounted separately from the seat element and, as is conventional, may be mounted rigidly to the vehicle body independently of seat member 34. In the present form of the invention each seat member is attached to the vehicle body floor at its rear portion by a pivoting and guiding linkage mechanism shown in detail in Fig. 4.

The vehicle floor is designated 36 and an attaching bracket 37 is rigidly associated with the lower rear portion of each of the seat members 32 and 34. A three-piece double hinge device is designated generally 38 and comprises a lower member 39 attached to vehicle floor 36, an upper member 40 attached to seat bracket 37 and an intermediate link member 41 which is pivoted at its forward end to member 39 and at its rear end to member 40. From this it will be seen that a positive forward bodily displacement of one of the seat members 32 or 34 will be accompanied by an upward movement of the lower rear portion of the seat member due to the swinging movement of intermediate link 41.

Reference will now be had to the mechanism for producing substantial upward movements of the front portions of the seat members to produce the primary cradling action which is the subject of the present invention. In this connection reference will be had particularly to Figs. 2, 5 and 8. As shown in Fig. 3, the front seat structure comprises a base 42 which is connected to the vehicle floor by the connection devices 38 previously described and a frame member 43 which is mounted for forward and rearward adjustment on base member 42 in any conventional manner such as is usually provided for front seat adjustment in motor vehicle construction. In the present instance this front seat adjustment is independent of the vehicle seat movement arrangement of the present invention and the seat tilting mechanism of the present invention acts directly on the forward portion of base 42 to lift it and the superposed seat frame 43 and seat 32, and with it the seat back 33, in a manner which will now appear.

Referring particularly to Fig. 2, a pair of horizontal hydraulic cylinders 50 and 51 are mounted upon floor 36 of the vehicle beneath the front portion of front seat member 32. The operating fluid conduits to cylinders 50 and 51 are designated 52 and 53, respectively, and lead from main operating supply conduit 27. The linkage mechanism which connects between operating cylinders 50 and 51 and the base member 42 of front seat 32 is best shown in Fig. 8 which is a rear view of hydraulic cylinder 51 and its operating linkage. In Fig. 8 the piston of hydraulic cylinder 51 is designated 55 and its piston rod is designated 56.

A linkage mechanism shown in detail in Fig. 8 connects between the outer end of piston rod 26 and the seat base member 42 to raise and lower the latter upon outward and inward movements of piston rod 56, respectively. This linkage comprises a pair of crossed links 60 and 61 pivoted as at 62, and a second pair of links 63 and 64 which are centrally pivoted to each other as at 65 and are pivoted at their outer ends to the upper ends of the crossed links 60 and 61. The lower outer end of link 60 is connected with the outer operating end of piston rod 56 in a manner which will presently appear in greater detail and the lower outer end of the other crossed link 61 is pivoted as at 67 to an anchoring bracket 68, likewise in a manner which presently will be described in greater detail. The pivotal connecting means 65 of links 63 and 64 includes a pivot member 70 which has horizontal pivotal connection with a bracket 71 fixed to seat base member 42.

The pivotal connection 67 is shown in detail in Fig. 10 and in the present instance comprises a universal joint whereby the lower end of link 61 is not only pivoted about a longitudinal axis with respect to the vehicle but is also free to pivot about a generally horizontal transverse axis.

To this end the lower end of link 61 is bifurcated as shown in Fig. 10 and includes a cross pin 75 and a central ball formation 76 which seats in a complementary ball seat member 77 carried by bracket 68.

As best shown in Fig. 9, the lower pivotal connection of link 60 comprises a clevis member 80 which includes a bearing portion 81 rotatably mounted upon the outer end of piston rod 56. The latter is provided with a fixed cross pin 83 which extends through vertically elongated slots 84 in the bearing portion 81 of clevis 80. The outer ends of cross pin 83 are guided for horizontal movement in horizontal slots 85 formed in a pair of upstanding wall members 86 fixed to the floor 36 of the vehicle. In the instance illustrated in Fig. 8 bracket 68 and wall members 86 are fabricated as a unit and fixed as a unit to floor 36, cylinder 51 being in turn mounted upon the unitary member which includes wall members 86 and bracket 68. Thus, the entire mechanism may be fixed to floor 36 as a single unit.

It will be seen from the foregoing that movement of piston 55 to the left as viewed in Fig. 8 will, by acting upon the lower pivotal connection of link 60, cause pivotal connection 65 and thus seat base member 42 to be projected upwardly. Opposite movement of piston 55 will of course be accompanied by downward movement of seat base member 42. In addition to this the entire linkage is free to rock forwardly and rearwardly about a lower transverse horizontal axis by reason of pivotal connection 70, the ball and socket joint 76, 77, and the rotatable mounting of bearing portion 81 of clevis member 80 on piston rod 56.

The front portion of seat 32 is biased to its normal downward position by an extension coil spring 89, shown in Fig. 5, which engages generally vertically between upper pivot 65 and one of the lower stationary wall members 86. Of course the weight of the seat itself and any passengers thereon also bias the seat to a downward position. The linkage shown in Fig. 5 is associated with the other front seat cylinder 50 but corresponds to the opposite linkage shown in Fig. 8 and the parts thereof are identified by corresponding numerals. Further, similar linkage mechanisms are provided for operating the rear seat member 34 in accordance with the present invention but the description thereof need not be repeated.

Reference will now be had to the hydraulic means provided for energizing the seat raising cylinders 50 and 51 of the front seat structure and the corresponding pistons of the rear seat structure, the latter being designated 90 and 91 in Fig. 1. In this connection reference will be had particularly to Fig. 7. The valving device 31 comprises a cylindrical chamber including a generally discoidal piston member 95, the pressure conduit 30 from the hydraulic braking system being arranged to communicate with the cylindrical chamber at one side of piston member 95 while a passage 96 leads from the cylindrical chamber at the opposite side of piston member 95 and, by way of a shutoff valve 98, leads to a T-fitting 99 which is interposed in the main fluid conduit 27 leading from the upper operated cylinders 22 to the several seat actuating hydraulic cylinders 50, 51, 90 and 91.

Discoidal piston 95 is provided with a central restricted orifice 101 which extends generally therethrough. On relatively light and gradual brake applications the hydraulic pressure transmitted through conduit 30 and acting against the small end of piston member 95 will be insufficient to cause the large right-hand area of piston 95 to displace sufficient hydraulic medium to produce an operating force in the seat pistons 50, 51, 90 and 91. However, under sudden and more violent brake applications such displacement of piston 95 will be produced despite the presence of restricted orifice 101 and the amount of fluid displaced will be proportionate to the intensity of brake application.

Thus the linkage acting between the seat operating cylinders and the seat frames will act to raise the front ends of the seats to a degree proportionate to the intensity of brake application. This raising of the fronts of the seats is, of course, in the present instance, accompanied by a greater or less degree of bodily forward movement of the seats under control of the intermediate pivoted links 41. The positional movements of the seats thus effected is indicated generally by the dot-and-dash line showings in Fig. 3. As stated heretofore, the degree of seat movement upon various brake applications will vary with the intensity of brake application. In general, the seat movement engendered by impact against the actuating means 21 and consequent activation of hydraulic cylinders 22 will generally, although not necessarily, be of considerably greater intensity and consequently produce considerably greater amplitudes of seat movement than those resulting from varying degrees of brake application.

What is claimed is:

1. In an automotive vehicle, a passenger seat, means attaching said seat to said vehicle for movement generally about a transverse axis adjacent to the lower rear portion of said seat, hydraulic fluid motor means for raising the front portion of said seat generally about said axis, a conventional front bumper, hydraulic fluid pressure generating means mounted on said bumper, transversely extending actuating means forwardly of said conventional bumper and freely movable toward the latter upon impact with an obstruction, a connection between said actuating means and said generating means movable to produce operating hydraulic fluid pressure by and upon such movement, and a hydraulic conduit between said generating means and said fluid motor means for operating the latter upon activation of the former to raise the front portion of said seat upon impact against said actuating means.

2. In an automotive vehicle, a passenger seat, means attaching said seat to said vehicle for movement generally about a transverse axis adjacent the lower rear portion of said seat, hydraulic fluid motor means for raising the front portion of said seat generally about said axis, a conventional front bumper, hydraulic fluid pressure generating means transversely extending actuating means forwardly of said conventional bumper and mounted for free rearward movement toward the latter upon engagement against an obstruction, a connection between said actuating means and said generating means movable to produce operating hydraulic fluid pressure upon movement of said actuating means toward said conventional bumper, and a hydraulic conduit between said generating means and said fluid motor means for operating the latter upon activation of the former to raise the front portion of said seat upon impact against the front of said actuating means.

3. In an automotive vehicle, a passenger seat, means attaching said seat to said vehicle for movement generally about a transverse axis adjacent to the lower rear portion of said seat, fluid motor means for raising the front portion of said seat generally about said axis, a hydraulic brake system including a master cylinder, a fluid pressure connection between said master cylinder and said fluid motor means, and fluid pressure regulating means in said pressure connection whereby pressure beyond a predetermined degree in said brake system produces activation of said fluid motor means to raise the front portion of said seat.

4. In an automotive vehicle, a passenger seat, means attaching said seat to said vehicle for movement generally about a transverse axis adjacent to the lower rear portion of said seat, fluid motor means for raising the front portion of said seat generally about said axis, a hydraulic brake system including a master cylinder, a fluid pressure connection between said master cylinder and said fluid motor means, and pressure control means in said fluid pressure connection whereby excess pressure in said brake system activates said fluid motor means in proportion to the magnitude of said excess pressure to raise the front portion of said seat proportionately.

References Cited in the file of this patent

UNITED STATES PATENTS

| 1,713,492 | Garbade | May 14, 1929 |
| 1,784,387 | Postel | Dec. 9, 1930 |
| 2,102,979 | Smith | Dec. 21, 1937 |
| 2,227,717 | Jones | Jan. 7, 1941 |
| 2,335,340 | Koppelman | Nov. 30, 1943 |
| 2,433,950 | Henderson | Jan. 6, 1948 |
| 2,660,222 | Woodsworth | Nov. 24, 1953 |
| 2,720,275 | Thayer | Oct. 11, 1955 |
| 2,725,921 | Markin | Dec. 6, 1955 |
| 2,736,566 | Hartl | Feb. 28, 1956 |

FOREIGN PATENTS

| 314,894 | Italy | Feb. 9, 1934 |